United States Patent
Lopez Moreira

(10) Patent No.: US 11,626,093 B2
(45) Date of Patent: Apr. 11, 2023

(54) METHOD AND SYSTEM FOR AVOIDING HOWLING DISTURBANCE ON CONFERENCES

(71) Applicant: Unify Patente GmbH & Co. KG, Munich (DE)

(72) Inventor: Alexandre Lopez Moreira, Ingolstadt (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/626,180

(22) PCT Filed: Jul. 25, 2019

(86) PCT No.: PCT/EP2019/070127
§ 371 (c)(1),
(2) Date: Jan. 11, 2022

(87) PCT Pub. No.: WO2021/013363
PCT Pub. Date: Jan. 28, 2021

(65) Prior Publication Data
US 2022/0375445 A1    Nov. 24, 2022

(51) Int. Cl.
*G10K 11/16* (2006.01)
*G10L 25/51* (2013.01)
*H04M 3/56* (2006.01)

(52) U.S. Cl.
CPC ............. *G10K 11/16* (2013.01); *G10L 25/51* (2013.01); *H04M 3/568* (2013.01)

(58) Field of Classification Search
CPC ......... G10K 11/16; G10L 25/51; G10L 25/18; H04M 3/568; H04M 3/002; H04M 9/082; H04M 3/569; H04R 3/02
See application file for complete search history.

(56) References Cited

U.S. PATENT DOCUMENTS 7,577,260 B1 *   8/2009   Hooley ............... F41H 13/0081
                                                       381/307
8,050,398 B1 *  11/2011   Xu ........................ H04M 9/082
                                                      379/392.01

(Continued)

FOREIGN PATENT DOCUMENTS

EP    3594802 A1 *  1/2020  ............. G06F 3/165
GB    2293077 A  *  3/1996  ............... H04R 3/02

(Continued)

OTHER PUBLICATIONS

International Search Report for PCT/EP2019/070127 dated Apr. 15, 2020.

(Continued)

*Primary Examiner* — Akelaw Teshale
(74) *Attorney, Agent, or Firm* — Buchanan Ingersoll & Rooney PC

(57) ABSTRACT

Method and System for avoiding howling disturbance especially on conferences, wherein the method comprising the steps of using a howling detector unit implemented inside a multipoint control unit to receive an audio stream input from a client, analyzing the audio input with the howling detector in order to verify if howling noise is present, using at least two of a skewness analysis, a flatness analysis, a crest analysis, a rolloff analysis and preventing the audio stream input to be forwarded as an output to an audio mixer, if howling noise is present.

20 Claims, 3 Drawing Sheets

(56) References Cited

U.S. PATENT DOCUMENTS

Figure 1:
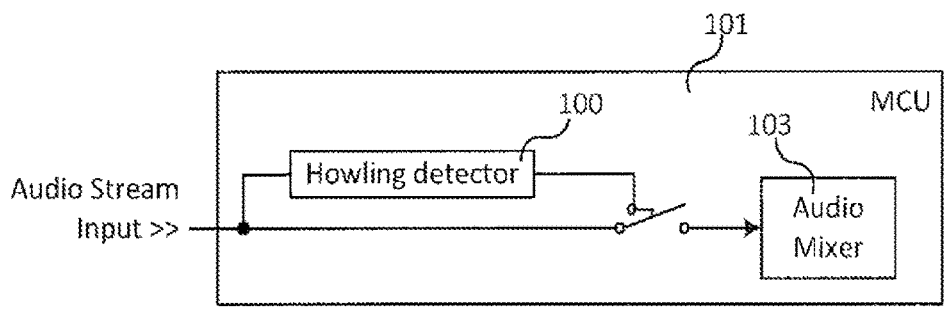

| | | | | |
|---|---|---|---|---|
| 2008/0091415 A1* | 4/2008 | Schafer | ............... | G10L 19/0208 704/E21.007 |
| 2009/0185695 A1* | 7/2009 | Marton | ................. | H04M 9/082 381/66 |
| 2010/0322387 A1* | 12/2010 | Cutler | ..................... | H04M 3/56 379/406.01 |
| 2012/0250830 A1 | 10/2012 | Lam et al. | | |

FOREIGN PATENT DOCUMENTS

| | | | | |
|---|---|---|---|---|
| WO | WO-0123104 A2 * | 4/2001 | ......... | F41H 13/0081 |
| WO | 2016130459 A1 | 8/2016 | | |
| WO | 2019067718 A2 | 4/2019 | | |
| WO | WO-2019067718 A2 * | 4/2019 | ............. | G10L 25/48 |

OTHER PUBLICATIONS

Written Opinion of the International Searching Authority for PCT/EP2019/070127 dated Apr. 15, 2020.

* cited by examiner

METHOD AND SYSTEM FOR AVOIDING HOWLING DISTURBANCE ON CONFERENCES

The present invention deals with a method and a system for avoiding or preventing howling noise disturbance especially on conferences.

Conferences are becoming each day larger, with participants from all around the world. The participants may be accessing the conference from any kind of environment; they may be accessing the conference from the company site, through mobile devices, at home when working as home-office, from inside conference rooms and others. In such a scenario it is impossible to control the device quality or the environment quality from which each participant is connecting to the conference. In such a complex situation a very common problem that the conference participants may face is when there is some participant adding howling noise to the entire conference. The howling noise is caused when there is a high gain audio feedback between the participant microphone and speakers, i.e. when the microphone is capturing the speaker output, creating an acoustic audio bridge.

The howling effect, also called squealing or singing effect, generates a high power and generally high frequency noise in the audio transmitted by the user's device. It is a noise that makes everyone in the conference very disturbed, normally leading to a conference pause where all participants are asking to each other who is generating this howling and asking to mute the source of disturbance.

According to US 20070121928 A1 the howling effect is a special type of echo effect. The howling happens when the acoustic audio is fed back with no loss in its power. In other words, the howling noise appears when the echo-return-loss (ERL) is less or equal than 0 dB at certain frequencies, or when the total loop gain exceeds 0 dB at certain frequencies.

The frequency response of a closed acoustic loop (CAL) has many peaks and valleys and acoustic feedback systems are stable when the gain of the CAL system is less than 0 dB for the entire frequency spectrum. When the instability is reached out, the howling noise appears with its power increasing very quickly.

It is not the intention of the present invention to replace echo-cancelers, or the addition of another layer to automatically act when the CAL becomes unstable, which is the case where the echo-canceler becomes ineffective since it is supposed to work with stable CAL.

The time that the howling effect takes to appear or the time it takes to become annoying depends on the return gain level and on the acoustic tail circuit delay, which is the time span of the acoustic picture and roughly represents the delay in time for the last significant echo to arrive at the microphone.

Acoustic echo canceler (AEC) methods when applied may delay the presence of the howling effect, but it highly depends on its convergence time, that is the time required for the echo canceller to fully learn the acoustic picture of the room; and it depends also on the echo return loss enhancement (ERLE), that is the amount of attenuation which is applied to the echo signal in the process of echo cancellation.

Depending on these parameters and also depending on the echo return loss (ERL) value of the CAL, the AEC will be able to eliminate the howling noise or at least to delay its presence, but it will never be able to completely remove the howling effect if the ERL value is less or equal than 0 dB, since it will make the system unstable.

Another AEC element that will affect its capabilities for eliminating the howling noise is the actuation of the double-talk detector (DTD). Double-talk occurs when the two talkers on both sides speak simultaneously. In the double-talk situation, the near-end speech acts as a large level uncorrelated noise to the adaptive algorithm. The disturbing near-end speech may cause the AEC adaptive filter to diverge. Hence, annoying audible echo will pass through to the far-end. The common way to mitigate this problem is to slow down or completely halt the filter adaptation when presence of near-end speech is detected. This is the very important role of the so-called double-talk detector (DTD).

Considering it, the DTD performance may be critical for the AEC capabilities for eliminating howling noise, since that by its own nature the howling noise appears as a double talk situation in the near end, and then the actuation of the DTD could slow down or completely halt the AEC detector.

The main problem that howling effect is still present in large conferences even with AEC implemented is that it is impossible to assure that all participants would participate from an environment where the ERL is lower than 0 dB. Participants may attend the conference from their mobile devices, desk phones, desktop PC at house or in the company, conference rooms or even in front of a desktop shared among some people of the company. From all of these possibilities, the most critical for howling effect and nowadays the most common is attending the conference from desktop PC or conference rooms.

In personal computers it is normal to have two or even more layers for controlling speaker gains and microphone sensitiveness, it is normal to have a speaker/microphone disposition that could lead to high acoustic audio feedback gains and the room where the equipment is placed may be favorable to audio reverberation, which could also contribute to the feedback gains. In this situation, it is not possible to control also the quality of the audio device, speakers and microphones.

A prove that such a situation is perfectly real can be found when searching for a solution to the problem in the two greatest personal computer operating system companies. Microsoft and Apple provide AEC solution, but at the end they recommend some manual operations in the speaker/microphone disposition to be done if the problem persists.

In a conference, the howling noise is spread to all participants because all user audios are mixed in the Multipoint Control Unit (MCU), here usually a Media Server, and then the mixed audio is sent to all participants.

When one participant is entering in the conference from an environment where there is a high level of audio feedback, all the participants may suffer when hearing the high noise and high-power howling noise. The signal mixer in the MCU may also increase the probability of high gain acoustic closed loops.

The problem of audio feedback with desktop is recurrent, and even with echo cancelers implemented in their operating systems it still happens. And if the gains are too high in some amplified speaker or in the microphone sensitiveness, it will appear as howling noise.

According to prior arts all solutions work by trying to discriminate the signal from the howling noise and by this mean they try to remove the howling noise and recover the voice signal. One problem with this approach is that it is a CPU intensive approach, but the biggest problem is that it will never be able to recover the voice signal entirely. After the howling noise took place, there is always problem with clipped signal and the problem that the voice noise is too low in comparison with the howling noise, what makes it difficult to recover the voice signal and still have a good audible quality. It must be remembered that the howling noise happens due to high gain loops and in such a case, its power increases quickly along the time until the physical limits of the system is achieved.

In the case where the physical limits of the system are achieved, the signal is then clipped out, which is a not linear noise added to the system. Clipping out the signal is very likely to remove signal characteristics of the original signal itself.

In addition, there are some prior arts trying to solve the high gain feedback by using echo cancelers combined with some kind of special module for dealing with the howling noise, but all of them determine some operational conditions related to the audio feedback gain where they work.

For example, JP4743018 B2 discloses a Howling removal device which however must be implemented in the client in order to become effective. The problem is that using an array of notch filters is a CPU intensive procedure that is not likely to be implemented in the client side.

US 2018/0132038 A1 discloses an intrinsically safe audio system management for conference rooms. However, such a system has the drawback that it works by detecting and canceling the echo by injecting marker signals to the audio in order to calculate the feedback order. The markers have to be low power markers in order to avoid becoming audible to the user. And then, it is not guaranteed that the marker will be intact after the high gain loop takes place generating the howling noise. Another problem is that it depends on client specific implementation.

U.S. Pat. No. 7,269,252 B2 discloses a method and apparatus for improving nuisance signals in audio video conference. However, this referenced prior art does not disclose any method for detecting the noise and it gives a generalized solution for the problem, where the user is required to perform some action in order to come back to the conference. According to this method the user must act generating audio events, like sending DTMF digits, in order to return to the conference, which is an ineffective method since its audio is suffering from howling effect and then the DTMF is not likely to be detected.

US 2007/0121928 A1 discloses an Anti-Howling structure. Here a situation is considered where the ERL gain is relatively controlled considering its limited scope usage in telephone devices, which does not cover the described problem to a variety of device types and environments. This reference must deal with the duality problem with the size of the anti-howling filter regarding its ERLE capabilities and its response time, which would become even more critical to establish an ideal filter size parameter in a non-controlled environment.

U.S. Pat. No. 6,798,754 B1 discloses an acoustic echo cancellation equipped with howling suppressor and double-talk detector. This document discloses an improper interpretation of the howling noise occurrence due to it declares that "howling usually occurs at one single frequency" and bases its howling suppression method on this argument. Then the proposed method "suggests an effective way of introducing a null value at the frequency that howling occurs" which is the application of a single filter on a single frequency, which was a solution refuted even by US 20070121923A1. Howling noise normally happens in a plurality of frequencies in such a way that sometimes the generated harmonics would cover almost all the spectrum. By applying such an approach proposed by this document at the end the filter would have to filter the entire signal generating a silence output.

Therefore, the present invention is based on the object to overcome the above-described problems. In particular, the present invention is based on the object to provide a method and system for detecting the situation of howling occurrence and to take a measure before it reaches all the conference participants and not try to handle an unstable system loop.

These objects are solved according to the present invention by a method for avoiding howling noise disturbance especially on conferences having the features according to claim 1, and a system for preventing howling noise disturbance having the features according to claim 8. Preferred embodiments of the invention are specified in the respective dependent claims.

Accordingly, a method for avoiding howling disturbance especially on conferences the method comprising the steps of:

using a howling detector unit implemented inside a multipoint control unit to receive an audio stream input from a client;

analyzing the audio input with the howling detector in order to verify if howling noise is present, using at least two of a skewness analysis, a flatness analysis, a crest analysis or a rolloff analysis;

preventing the audio stream input to be forwarded as an output to an audio mixer, if howling noise is present.

By the inventive method, howling noise can be detected by analyzing an audio stream input with at least two of a skewness analysis, a flatness analysis, a crest analysis or a rolloff analysis. Each of these so-called spectral analyses will perform a statistical analysis on the frequency spectrum given as input and each of them will give an indication about the howling noise presence. Each individual statistical analysis is probably not able to determine exactly the presence of the howling noise, but analyzed together in a combination of at least two or more analysis they will give an accurate indication about the presence of the howling noise.

After having a result about the howling presence, the howling detector outputs the result to other layers in the MCU. The MCU decides then to block or unblock the audio from being mixed to the other conference participants. If the MCU is in a state where the howling noise was already detected and the howling detector output is false, it may unblock the audio. If the MCU is in a state where the holing noise was not detected and the howling detector output is true, it may block the audio.

Further according to another embodiment, the proposed invention discloses a method for automatically muting and unmuting the noisy conferee due to it is possible to detect the presence of a specific common noise. Within the meaning of the present invention common noise or sound-like noise is different from talk-like noise. By comparing these different noise-sets using the inventive method it is able to automatically detect sound-like noise such as howling noise in a client audio stream and automatically mute it. This is in contrast to prior-art which does not consider the characteristics of howling effect, which superimposes any other audio due to its high-power characteristic.

A further advantage of the proposed invention is that it does not disclose just an action to be taken, like prior art does, but also a new method for detecting the disturbance noise. According to the present invention with the detection of howling noise it is possible to mute the channel source instead of actively transforming the input audio stream into a silence output audio stream.

Further to the solution according to the present invention it is able to deal with howling noise even when the feedback gain is too high and out of the control of the user. For a certain level of gain in the audio fed back, there is no other option than turning off the channel as fast as possible and inform the user to configure his environment in a manner to avoid such a situation. This is the solution proposed here.

One other advantage of the present invention is that it works with a fast algorithm for detecting the noise without trying to handle it by generating a filtered output, which is an approach that is more CPU intensive.

A further benefit of the present invention is that the MCU does not rely on client-side implementation in order to avoid howling noise disturbances to all the conference participants.

According to another preferred embodiment of the method a DC filtering is used prior to the input of the audio stream to the howling detector unit. The DC filter may be any simple time domain DC filter, like extracting the mean value from the audio input block. Further this filter step is optionally implemented in the howling detector analysis process. A common effect of high gain acoustic loop is the creation of 0 Hz frequency components (DC) in the signal. This DC has no direct audible effect in the audio for the listener, but it may cause some divergence while analyzing the signal spectrum.

The method, according to another preferred embodiment, further comprises a step of transforming the output of a DC filter with an optionally FFT (Fast Fourier Transformation) unit. The size of the FFT could be any size, but it is recommended small sizes, like 128 milliseconds, in order to avoid delaying the howling detection. Small sizes for the FFT unit 302 will also improve performance characteristics of the detector, but it could not be too small in a way that it may affect the precision of the detector.

According to another preferred embodiment of the inventive method the skewness analysis gives a measure of the asymmetry of a distribution around its mean value. Skewness equal 0 indicates a symmetric distribution. Higher skewness values indicate more energy on the left, which represents the lower frequencies in the spectrum. Lower skewness values indicate more energy on the right, which represents the higher frequencies in the spectrum. The howling noise normally tends to have more concentrated power in the higher frequencies of the spectrum, and then lower skewness values give an indication of howling noise presence. The skewness has high values for voiced speech where substantial energy is present around the fundamental frequency, and then it will be also used in order to discriminate voiced speech from howling noise.

According to another preferred embodiment of the inventive method the flatness analysis calculates the ratio of the geometric mean to the arithmetic mean and it will provide a way to quantify how noise-like a sound is, as opposed to being tone-like. Noise-like signals have higher flatness values, since noises tend to cover all frequencies of the spectrum. Tone-like signals have lower flatness values, since tones create peaks in specific regions of the spectrum. The howling noise normally tends to have one or two small peaks, but it also spreads the noise around the entire frequency spectrum, and then higher flatness values give an indication of howling noise presence.

According to another preferred embodiment of the inventive method the crest analysis calculates the ratio of the peak values within the spectral frequencies to the arithmetic mean of the energy spectrum, which will indicate how extreme the peaks are in a waveform. The howling noise normally tends to have some peaks in the spectrum, but they are not extreme peaks, and then lower crest values give an indication of howling noise presence.

According to another preferred embodiment of the inventive method the rolloff analysis calculates the frequency so that a pre-defined percentage of the signal energy is contained below this frequency. The howling noise tends to have higher values for the rolloff values and then high rolloff values give an indication of howling noise presence. A pre-defined percentage suggested for the calculation is 90%.

According to another preferred embodiment of the inventive method the output of the spectrum analysis being queued separately by the fixed sized circular queues. The queue elements being initialized to zero at each initial position, and for each time that a new spectrum analysis result is inserted to the queue, the oldest queue value being removed, maintaining the queue size with the same fixed length and ignoring older values that become no relevant anymore as the time passes. The first accurate howling noise detection will be given just after at least two elements of queues are filled by the respective spectrum analysis outputs, but the next accurate howling analysis result will be given at each time that an input (e.g. an input of an FFT unit) is given to be analyzed.

The largest the queue size is, the slower will be the first detection of the howling noise, and then it is suggested to avoid larger queue sizes. Larger queues sizes must be avoided also in order to avoid audio from longer time in the past to influence in the present howling analysis result. But the queue size cannot be so small that it may affect the stability of the howling detection procedure.

For a case where an FFT unit creates a frequency spectrum based on 128 milliseconds of audio, the suggested value for each queue size is 4 elements, which would give an accurate howling noise result after the first 512 milliseconds of audio and just the last 512 milliseconds of audio will influence the present howling noise detection result. After the first 512 milliseconds of audio arrives, the detector generates a result after each 128 milliseconds.

According to another preferred embodiment of the inventive method the elements of each of the queues will be averaged individually. This average is done in order to have an overall picture about the spectrum analysis results in the past periods of audio. Optionally, the audio period relevant to each howling detection result is defined by queue sizes and by FFT size.

According to another preferred embodiment of the inventive method the output of the average will be compared by a comparator unit using an individual threshold value. Each average input will be compared with a threshold value determined specifically for each spectrum analysis parameter.

As described earlier, the skewness value must be low. Then a fixed threshold value (thd1) must be determined in order to represent how low the skewness should be in order to create an indication of howling noise presence. A comparator unit compares the output of the average against the fixed threshold value (thd1), and if it is lower than the fixed threshold value (thd1), it will output a true result.

As described earlier, the flatness value must be high. Then a fixed threshold value (thd2) must be determined in order to represent how high the flatness should be in order to create an indication of howling noise presence. A comparator unit compares the output of the average against the fixed threshold value (thd2), and if it is higher than the fixed threshold value (thd2), it will output a true result.

As described earlier, the crest value must be low. Then a fixed threshold value (thd3) must be determined in order to represent how low the crest should be in order to create an indication of howling noise presence. A comparator compares the output of the average against the fixed threshold value (thd3), and if it is lower than the fixed threshold value (thd3), it will output a true result.

As described earlier, the rolloff value must be high. Then a fixed threshold value (thd4) must be determined in order to represent how high the rolloff should be in order to create an indication of howling noise presence. A comparator unit compares the output of the average against the fixed threshold value (thd4), and if it is higher than the fixed threshold value (thd4), it will output a true result.

According to another preferred embodiment of the inventive method an AND port unit will receive the output from each comparator. If all the comparators outputs true, indicating that all the threshold rules were attended, then it outputs true indicating that a howling noise is really present in the audio signal. If any one of the comparators outputs a false result, it means that no howling noise is present anymore, and then it will output false, indicating that no howling noise is present in the audio signal.

Finally, after having a result about the howling presence, the howling noise detector outputs the result to other layers in the MCU unit 101. The MCU unit 101 decides then to block or unblock the audio from being mixed to the other conference participants. If the MCU unit 101 is in a state where the howling noise was already detected and the howling detector unit 100 outputs false, it may unblock the audio. If the MCU unit 101 is in a state where the howling noise was not detected and the howling detector unit 100 outputs true, it may block the audio.

According to another preferred embodiment of the inventive method in a situation where the participant is generating howling noise, there is no problem to avoid this participant audio from being mixed to the other participants, since his voice would not be audible at all due to the effects of the high-level noise generated by howling effect.

Besides blocking the participant audio stream inputs, the MCU e.g. a media server may automatically start a procedure to inform the noisy participants that are generating the disturbance about the occurrence, and then the participants will be able to arrange their environment in order to avoid disturbing the conference.

And further according to another preferred embodiment of the inventive method in a situation where the participant is generating howling noise, there is no problem to avoid this participant audio from being mixed to the other participants, since his voice would not be audible at all due to the effects of the high-level noise generated by howling effect.

As an optional embodiment, the participants that are not generating noise may be also informed that some participants are not being mixed to the conference because they are facing problems with audio.

According to another preferred embodiment of the inventive method if the noisy participants solve the problem locally, this is automatically detected, and then they can be mixed again automatically to the conference audio since no howling noise was detected anymore. A text message informing it might be displayed to the user or all users as well.

The present invention proposes also a system or an application for situations where critical situation due to howling might occur. Such a system is advantageous on conferences, but it may be applied in any other case where the signal feedback is too high and the disturbance may affect many people.

The invention system is able to quickly detect when some conference participants are generating howling noise and disable their audio stream inputs before they become a disturbance for the entire conference.

The inventive system for avoiding howling disturbance especially on conferences comprises:
  a multipoint control unit;
  a howling noise detector unit for the detection of howling noise, if present, wherein the howling detector unit is implemented inside the multipoint control unit and is able to receive an audio stream input from a client;
  a prevention unit for disabling or enabling a procedure to prevent the audio stream input to be forwarded to an audio mixer.

By the inventive system the howling detector unit is able to receive the audio stream input from a client and analyzes the audio in order to verify if howling noise is present. If the howling noise is present, the stream input must be prevented from being an input to the audio mixer. If the howling noise is not present anymore, the client audio stream input has to be automatically mixed to the entire conference audio again. The procedure for disabling the audio input from the audio mixer can use any method, like replacing the audio input by a silence, just block the audio stream or even to mute the client application. Since the idea is to take control of the howling effect in a conference environment, the howling detector unit advantageously runs in the MCU side in order to assure that any incoming howling disturbance will not disturb the entire conference.

According to another preferred embodiment of the present invention a skewness analysis unit is added to the system. The skewness analysis unit gives a measure of the asymmetry of a distribution around its mean value. Skewness equal 0 indicates a symmetric distribution. Higher skewness values indicate more energy on the left, which represents the lower frequencies in the spectrum. Lower skewness values indicate more energy on the right, which represents the higher frequencies in the spectrum. The howling noise normally tends to have more concentrated power in the higher frequencies of the spectrum, and then lower skewness values give an indication of howling noise presence. The skewness has high values for voiced speech where substantial energy is present around the fundamental frequency, and then it will be also used in order to discriminate voiced speech from howling noise.

According to another preferred embodiment of the present invention a flatness analysis unit is added to the system. The flatness analysis unit calculates the ratio of the geometric mean to the arithmetic mean and it will provide a way to quantify how noise-like a sound is, as opposed to being tone-like. Noise-like signals have higher flatness values, since noises tend to cover all frequencies of the spectrum. Tone-like signals have lower flatness values, since tones create peaks in specific regions of the spectrum. The howling noise normally tends to have one or two small peaks, but it also spreads the noise around the entire frequency spectrum, and then higher flatness values give an indication of howling noise presence.

According to another preferred embodiment of the present invention a crest analysis unit is added to the system. The crest analysis unit calculates the ratio of the peak values within the spectral frequencies to the arithmetic mean of the energy spectrum, which will indicate how extreme the peaks are in a waveform. The howling noise normally tends to have some peaks in the spectrum, but they are not extreme peaks, and then lower crest values give an indication of howling noise presence.

According to another preferred embodiment of the present invention a rolloff analysis unit is added to the system. The rolloff analysis unit calculates the frequency so that a pre-defined percentage of the signal energy is contained below this frequency. The howling noise tends to have higher values for the rolloff values and then high rolloff values give an indication of howling noise presence. A pre-defined percentage suggested for the calculation is 90%.

Within the meaning of the invention one or more of the skewness analysis unit, the rolloff analysis unit, the crest analysis unit and/or the flatness analysis unit is also referred as spectral analysis units. And according to another preferred embodiment of the present invention, these spectral analysis units being preferably implemented in the howling detector unit.

According to another preferred embodiment of the present invention, a DC filter unit is optionally added in the input of the howling detector unit. The DC filter unit may be any simple time domain DC filter, like extracting the mean value from the audio input block. A common effect of high gain acoustic loop is the creation of 0 Hz frequency components (DC) in the signal. This DC has no direct audible effect in the audio for the listener, but it may cause some divergence while analyzing the signal spectrum.

According to another preferred embodiment of the present invention an optionally FFT unit is added. For example, the FFT unit might use as an input the output of a DC filter or likewise filters. The size of the FFT unit could be any size, but it is recommended small sizes, like 128 milliseconds, in order to avoid delaying the howling detection. Small sizes for the FFT unit will also improve performance characteristics of the detector, but it could not be too small in a way that it may affect the precision of the detector.

According to another preferred embodiment of the present invention the output spectrum generated by the FFT unit might become an input to at least one of the skewness analysis unit, flatness analysis unit, crest analysis unit and/or the rolloff analysis unit. Each of these analysis units will perform a statistical analysis on the frequency spectrum given as input by the FFT unit and each of them will give an indication about the howling noise presence. Each individual statistical analysis is probably not able to determine exactly the presence of the howling noise, but analyzed together in a combination of at least two or more analysis units they will give an accurate indication about the presence of the howling noise.

According to another preferred embodiment of the present invention the output of the skewness analysis unit, the flatness analysis unit, the crest analysis unit and/or the rolloff analysis unit being queued separately by a fixed sized circular queue. The queue elements being initialized to zero at each initial position, and for each time that a new spectrum analysis result is inserted to the queue, the oldest queue value being removed, maintaining the queue size with the same fixed length and ignoring older values that becomes no relevant anymore as the time passes. The first accurate howling noise detection will be given just after at least two queues are filled by the respective spectrum analysis outputs, but the next accurate howling analysis result will be given at each time an input to one of the spectrum analysis unit is given e.g. each time that an FFT unit gives an input to one of the spectrum analysis units.

The larger the queue size is, the slower will be the first detection of the howling noise, and then it is suggested to avoid larger queue sizes. Larger queues sizes must be avoided also in order to avoid audio from longer time in the past to influence in the present howling analysis result. But the queue size cannot be so small that it may affect the stability of the howling detection procedure.

According to another preferred embodiment of the present invention for a case where a FFT unit creates a frequency spectrum based on 128 milliseconds of audio, the suggested value for each queue size is 4 elements, which would give an accurate howling noise result after the first 512 milliseconds of audio and just the last 512 milliseconds of audio will influence the present howling noise detection result. After the first 512 milliseconds of audio arrives, the detector generates a result after each 128 milliseconds.

According to another preferred embodiment of the present invention the elements of each queue will be averaged individually by an average unit, respectively. This average is done in order to have an overall picture about the spectrum analysis results in the past periods of audio. The audio period relevant to each howling detection result is defined by the queue unit size and by the FFT size in FFT unit.

According to another preferred embodiment of the present invention the output of the average unit will be compared by individual threshold values in a comparator unit. Each average input will be compared with a threshold value determined specifically for each spectrum analysis parameter.

As described earlier, the skewness value must be low. Then a fixed threshold value (thd1) must be determined in order to represent how low the skewness should be in order to create an indication of howling noise presence. Such a comparator unit compares the output of an average unit against the fixed threshold value (thd1), and if it is lower than the fixed threshold value (thd1), it will output a true result.

As described earlier, the flatness value must be high. Then a fixed threshold value (thd2) must be determined in order to represent how high the flatness should be in order to create an indication of howling noise presence. Such a comparator unit compares the output of an average unit against the fixed threshold value (thd2), and if it is higher than the fixed threshold value (thd2), it will output a true result.

As described earlier, the crest value must be low. Then a fixed threshold value (thd3) must be determined in order to represent how low the crest should be in order to create an indication of howling noise presence. Such a comparator unit compares the output of an average unit against the fixed threshold value (thd3), and if it is lower than the fixed threshold value (thd3), it will output a true result.

As described earlier, the rolloff value must be high. Then a fixed threshold value (thd4) must be determined in order to represent how high the rolloff should be in order to create an indication of howling noise presence. Such a comparator unit compares the output of an average unit against the fixed threshold value (thd4), and if it is higher than the fixed threshold value (thd4), it will output a true result.

According to another preferred embodiment of the present invention an AND port unit is added to the inventive system. The AND port unit will receive the output from each of the comparator units and if all the comparators outputs true, indicating that all the threshold rules were attended, then it outputs true indicating that a howling noise is really present in the audio signal. If any one of the comparators unit outputs a false result, it means that no howling noise is present anymore, and then it will output false, indicating that no howling noise is present in the audio signal.

Finally, after having a result about the howling presence, the howling noise detector outputs the result to other layers in the MCU unit. The MCU unit decides then to block or unblock the audio from being mixed to the other conference participants. If the MCU unit is in a state where the howling noise was already detected and the howling detector unit outputs false, it may unblock the audio. If the MCU unit is in a state where the howling noise was not detected and the howling detector unit outputs true, it may block the audio.

According to another preferred embodiment of the present invention besides blocking the participant audio stream inputs, the system comprises means to automatically start a procedure to inform the noisy participants that are generating the disturbance about the occurrence, and then the participants will be able to arrange their environment in order to avoid disturbing the conference. These means can be provided for example by an MCU e.g. a media server.

In a situation where the participant is generating howling noise, there is no problem to avoid this participant audio from being mixed to the other participants, since his voice would not be audible at all due to the effects of the high-level noise generated by howling effect.

As an optional embodiment of the present invention the system comprises means to automatically inform the participants that are not generating noise that some participants are not being mixed to the conference because they are facing problems with audio.

When the noisy participants solve the problem locally, the system comprises means to automatically detecting this and to mix again automatically these participants to the conference audio since no howling noise was detected anymore. Optionally informing all or some of the participants about the remixing e.g. by displaying a text message or likewise action to the users.

According to another preferred embodiment of the present invention the system is part of a PBX, a telecommunication device of any kind, a computer, a web-application or every other system or device were howling noise might occur, like closed loop control systems with gain in the loop and systems equipped with Automatic Gain Control (AGC).

The invention and embodiments thereof will be described below in further detail in connection with the drawings.

Figure 2:
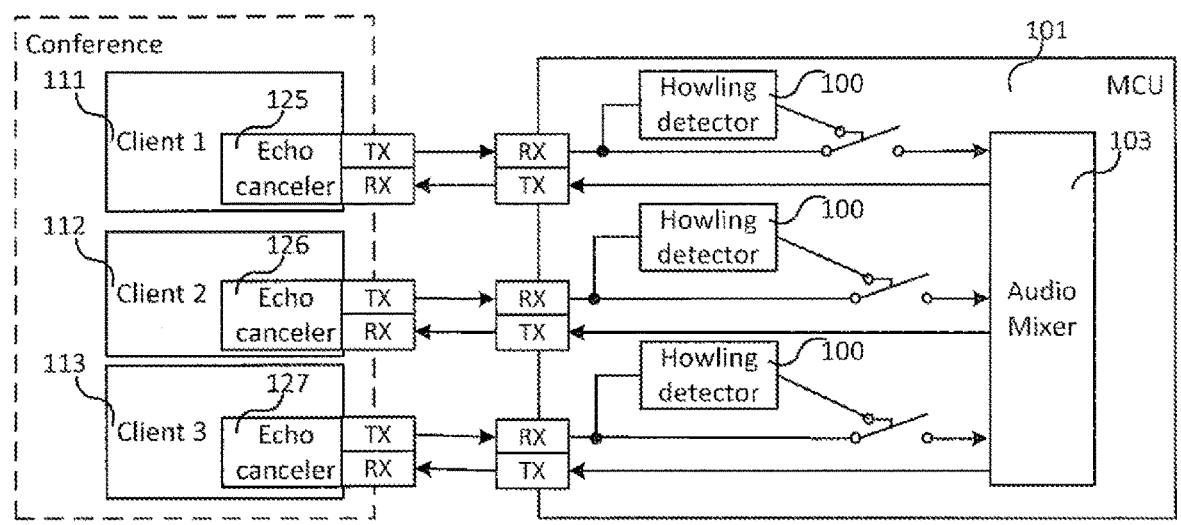
Figure 3:
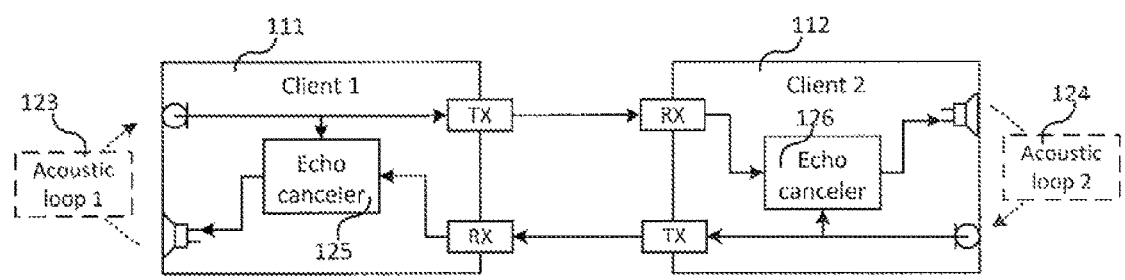
Figure 4:
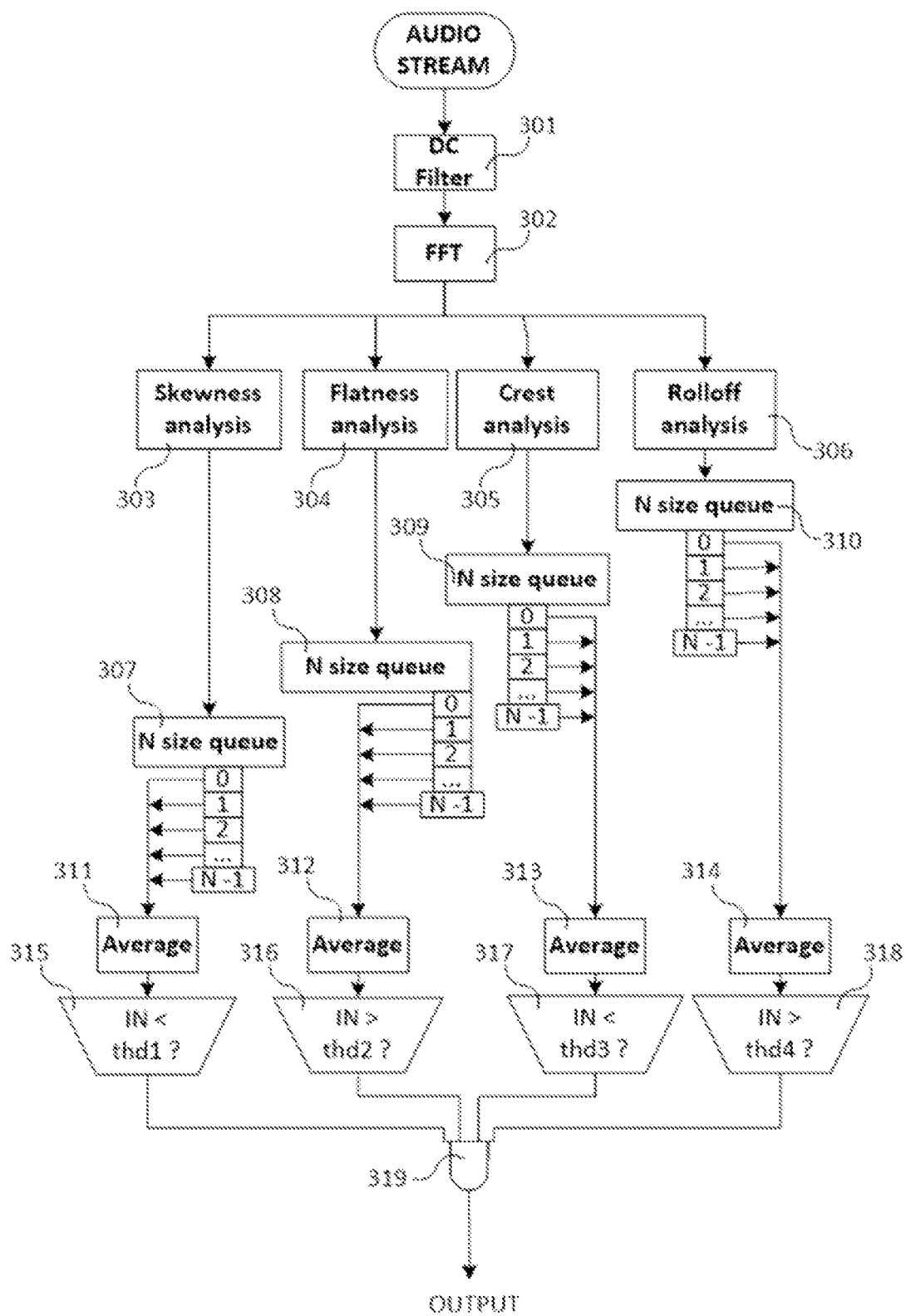
Figure 5:
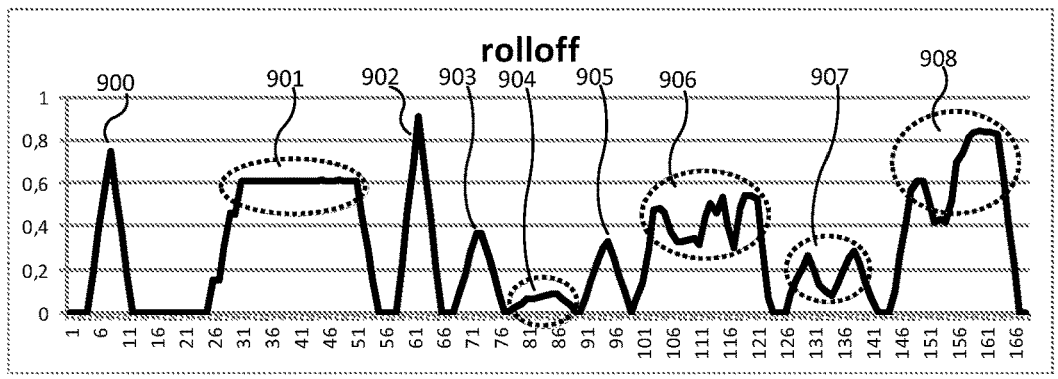
Figure 6:
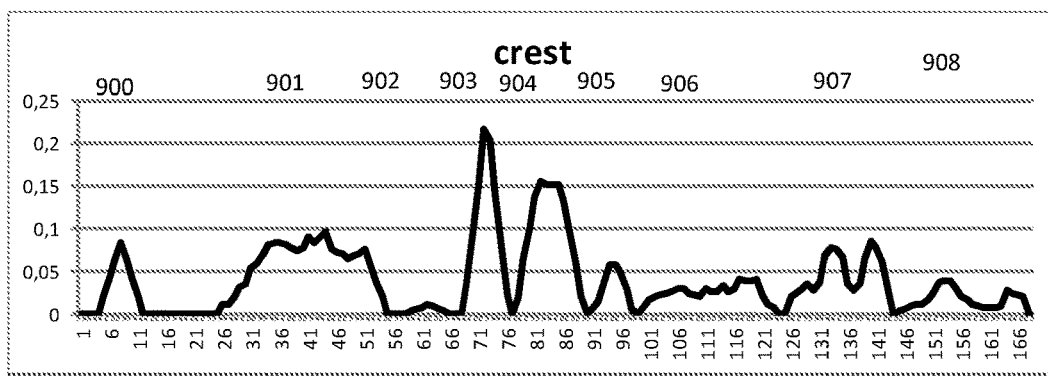
Figure 7:
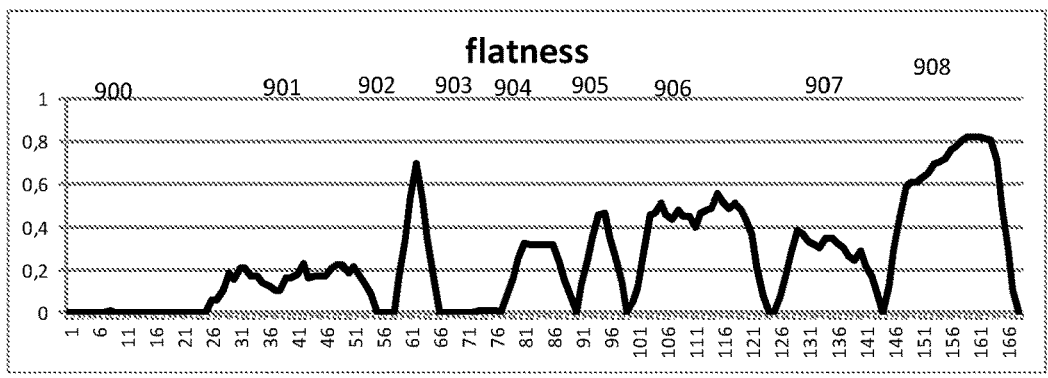
Figure 8:
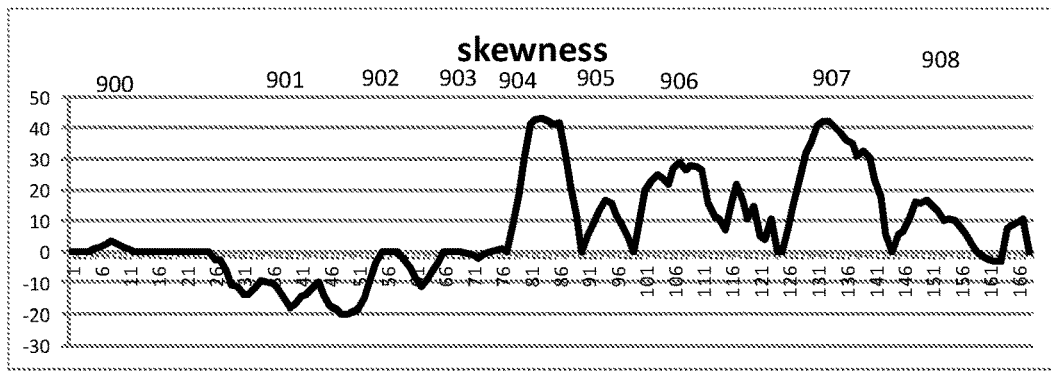

FIG. 1 schematically illustrates in a basic diagram an overview of the inventive system for just one howling detector in place according to one embodiment of the inventive system;

FIG. 2 schematically illustrates in a basic diagram an overview about howling detection disposition for a conference with three participants according to another embodiment of invention;

FIG. 3 schematically illustrates in a basic diagram an overview about echo-canceller procedures and the relationship with howling noise;

FIG. 4 schematically illustrates in a basic diagram an overview about the internal howling detector unit 100 procedures and components according to another embodiment of invention;

FIG. 5 schematically illustrates in a basic dot plot graphic saved output values of a skewness average unit 311 of a howling detector unit 100 according FIG. 4 which has been fed with different audio stream test specifications according to Table 1;

FIG. 6 schematically illustrates in a basic dot plot graphic saved output values of a flatness average unit 312 of a howling detector unit 100 according FIG. 4 which has been fed with different audio stream test specifications according to Table 1;

FIG. 7 schematically illustrates in a basic dot plot graphic saved output values of a crest average unit 313 of a howling detector unit 100 according FIG. 4 which has been fed with different audio stream test specifications according to Table 1;

FIG. 8 schematically illustrates in a basic dot plot graphic saved output values of a rolloff average unit 314 of a howling detector unit 100 according FIG. 4 which has been fed with different audio stream test specifications according to Table 1.

As schematically illustrated in FIG. 1, as an example of the inventive system for just one howling detector 100 in place according to one embodiment of the inventive system, the howling detector 100 is able to receive the audio stream input from a client and analyzes the audio in order to verify if howling noise is present. If the howling noise is present, the stream input must be prevented from being an input to the audio mixer 103. If the howling noise is not present anymore, the client audio stream input has to be automatically mixed to the entire conference audio again. The procedure for disabling the audio input from the audio mixer 103 can use any method, like replacing the audio input by a silence, just block the audio stream or even to mute the client application. Since the idea is to take control of the howling effect in a conference environment, the howling detector unit 100 advantageously runs in the MCU 101 side in order to assure that any incoming howling disturbance will not disturb the entire conference.

Normally, there is always some kind of echo canceler implementation in the client applications, but they are not enough to prevent howling, as it was described previously. And normally, MCU 101 have no echo canceler implementation in its streams, since this is a CPU intensive procedure, echo canceler leads to delay in audio and it must be implemented as close to the audio device as possible.

FIG. 2 schematically illustrates in a basic diagram an overview about howling detection disposition for a conference with three participants according to another embodiment of invention. Within the meaning of the invention and from a more technically point of view these participants are also called as clients 111, 112, 113. If one or more participant starts to generate howling noise that could pass through their echo canceller filter unit 125, 126 or 127, this noise will be packetized and sent to the MCU 101 by a stream transport medium. The MCU 101 will receive the packetized stream and convert it to a continuous audio stream again. After having the audio stream, the MCU 101 will be able to process the audio, and then, send it to be analyzed by a howling detector unit 100.

The howling detector unit 100 will detect when howling noise starts and when it stops. By detecting the noise presence or absence, the howling detector unit 100 could block or release the incoming audio from being mixed to the other participants by the audio mixer 103 unit. At any time that the noise presence state changes, the MCU 101 unit could also trigger the signaling layers of the system to send a message to the participants about the status changes.

As an example, in the FIG. 2, if the Client 1 111 starts to generate disturbance in the conference by generating howling noise, its audio input will be blocked and the other two participants Client 2 112 and Client 3 113 can continue talking without any disturbance. In this case, Client 1 111 will receive a message informing him that he must configure his environment in order to avoid generating howling noise in the conference.

As soon as Client 1 111 stops sending noise, its audio stream will automatically be mixed again to the conference and a message informing the occurrence will be sent to the Client 1 111 as well. As an optional configuration, the participants Client 2 112 and Client 3 113 may receive a message informing them about the situation of Client 1 111.

The basic operation of any echo canceler is the comparison of its microphone input with the incoming stream. If the echo canceler detects that its microphone input audio is also present in its incoming audio stream to be played in a speaker, it must filter out the part of the signal that is relatively equal to its microphone input and then send it to be played in the speaker.

FIG. 3 schematically illustrates in a basic diagram an overview about echo-canceller operation applied to a communication system. When Client 1 111 receives its audio input from the microphone, it saves the input in the echo-canceler unit 125 and sends it to the other peer Client 2 112. The Client 2 112 receives this stream and uses it as input for its echo canceler unit 126. The same procedure happens in the other way, from Client 2 112 to Client 1 111. The echo canceler unit 125 in Client 1 111 compares the received stream with the audio that was saved before in its echo canceler unit 125. By comparing the audio, the echo canceler is able to detect that the sent audio is present also in the received audio stream and by having this information it is able to filter out the echo. After filtering out its microphone input from its stream input, the audio is ready to be played in the speaker of Client 1 111. This procedure also happens in the other way.

If there is an acoustic loop 124 in Client 2 112 side, it will arrive as an echo in the Client 1 111, and its echo-canceler unit 125 must filter out this signal before sending it to the microphone.

Considering this example, if the participant of Client 1 111 is talking together with the participant of Client 2 112, the double talk problem is present. As said, the presence of double talk must disable or slow down the echo-canceler procedure in order to avoid even worse echo. This is done by the double talk detector.

Still considering this example, if the acoustic loop 123 in Client 1 111 and also the acoustic loop 124 in Client 2 112 are present the system finds itself in a situation that is favorable to produce the howling noise. It happens because both loops working together may appear to the echo-canceler as a double talk situation, since both microphones may receive audio input. It may not be a problem if the acoustic loop has low gains, but if this gain is amplified by the microphone or speaker devices, or by the system operating the audio device, it may become strong enough to trigger the double talk detector, which would slow down or disable the echo canceler procedure. It could be also strong enough to avoid the echo canceler algorithm to filter out the echo. In this case, considering this closed loop, the echo is very quickly transformed to a howling noise due to the high feedback rate of the system.

Such a situation even gets worse in a conference situation, since there is a greater probability to occur acoustic loops in the several clients sharing the same audio stream. In this case, even if there are just some clients with low gain acoustic loops, these gains end summed inside the MCU mixer, which could lead to an overall echo with increased power. This echo with increased power may quickly become a howling noise.

As described, the echo canceler works with two inputs and it depends on analyzing the audio after the complete loop circuit took place.

The invention describes a system which is able to remove the howling working just in the MCU 101 stream inputs without the need of any other reference signal and without needing to wait for the complete loop circuit to happen. By this mean, it may avoid any instability in the audio circuit loop before it takes place.

For each channel in the conference, there must be one howling detector unit 100 instance. The howling detector unit 100 will not perform any mathematical operation in order to transform the incoming audio into a filtered audio stream like echo cancellers do. Such approach will reduce CPU consumption from the algorithm since it will not have to produce another stream as output. The only output generated by the howling detector unit 100 will be a Boolean value informing that the MCU unit 101 could block or release the audio from being mixed to the other conference participants.

FIG. 4 schematically illustrates in a basic diagram an overview about the internal howling detector unit 100 procedures and components according to another embodiment of invention.

A common effect of high gain acoustic loop is the creation of 0 Hz frequency components (DC) in the signal. This DC has no direct audible effect in the audio for the listener, but it may cause some divergence while analyzing the signal spectrum. Then, a DC filter unit 301 is optionally added in the input of the howling detector unit 100. The DC filter unit 301 may be any simple time domain DC filter, like extracting the mean value from the audio input block.

The output of the DC filter unit 301 becomes an input to an optionally FFT unit 302. The size of the FFT unit 302 could be any size, but it is recommended small sizes, like 128 milliseconds, in order to avoid delaying the howling detection. Small sizes for the FFT unit 302 will also improve performance characteristics of the detector, but it could not be too small in a way that it may affect the precision of the detector.

The output spectrum generated by the FFT unit 302 will become an input to four spectral analysis units 303, 304, 305 and 306. Each of these spectral analysis units will perform a statistical analysis on the frequency spectrum given as input by the FFT unit 302 and each of them will give an indication about the howling noise presence. Each individual statistical analysis is probably not able to determine exactly the presence of the howling noise, but analyzed together in a combination at least of two or more analysis units they will give an accurate indication about the presence of the howling noise.

The skewness analysis unit 303 gives a measure of the asymmetry of a distribution around its mean value. Skewness equal 0 indicates a symmetric distribution. Higher skewness values indicate more energy on the left, which represents the lower frequencies in the spectrum. Lower skewness values indicate more energy on the right, which represents the higher frequencies in the spectrum. The howling noise normally tends to have more concentrated power in the higher frequencies of the spectrum, and then lower skewness values give an indication of howling noise presence. The skewness has high values for voiced speech where substantial energy is present around the fundamental frequency, and then it will be also used in order to discriminate voiced speech from howling noise.

The flatness analysis unit 304 calculates the ratio of the geometric mean to the arithmetic mean and it will provide a way to quantify how noise-like a sound is, as opposed to being tone-like. Noise-like signals have higher flatness values, since noises tend to cover all frequencies of the spectrum. Tone-like signals have lower flatness values, since tones create peaks in specific regions of the spectrum. The howling noise normally tends to have one or two small peaks, but it also spreads the noise around the entire frequency spectrum, and then higher flatness values give an indication of howling noise presence.

The crest analysis unit 305 calculates the ratio of the peak values within the spectral frequencies to the arithmetic mean of the energy spectrum, which will indicate how extreme the peaks are in a waveform. The howling noise normally tends to have some peaks in the spectrum, but they are not extreme peaks, and then lower crest values give an indication of howling noise presence.

The rolloff analysis unit 306 calculates the frequency so that a pre-defined percentage of the signal energy is contained below this frequency. The howling noise tends to have higher values for the rolloff values and then high rolloff values give an indication of howling noise presence. A pre-defined percentage suggested for the calculation is 90%.

The output of the spectrum analysis units 303, 304, 305 and 306 being queued separately by the fixed sized circular queues 307, 308, 309 and 310 respectively. The queue elements being initialized to zero at each initial position, and for each time that a new spectrum analysis result is inserted to the queue, the oldest queue value being removed, maintaining the queue size with the same fixed length and ignoring older values that becomes no relevant anymore as the time passes. The first accurate howling noise detection will be given just after all elements of the queues 307, 308, 309 and 310 are filled by the respective spectrum analysis 303, 304, 305 and 306 outputs, but the next accurate howling analysis result will be given at each time that the FFT unit 302 gives an input to the spectrum analysis units 303, 304, 305 and 306.

The largest the queue size is, the slower will be the first detection of the howling noise, and then it is suggested to avoid larger queue sizes. Larger queues sizes must be avoided also in order to avoid audio from longer time in the past to influence in the present howling analysis result. But the queue size cannot be so small that it may affect the stability of the howling detection procedure.

For a case where the FFT unit 302 creates a frequency spectrum based on 128 milliseconds of audio, the suggested value for each queue size is 4 elements, which would give an accurate howling noise result after the first 512 milliseconds of audio and just the last 512 milliseconds of audio will influence the present howling noise detection result. After the first 512 milliseconds of audio arrives, the detector generates a result after each 128 milliseconds.

The elements of each of the queues 307, 308, 309 and 310 will be averaged individually by the average units 311, 312, 313 and 314. This average is done in order to have an overall picture about the spectrum analysis results in the past periods of audio. The audio period relevant to each howling detection result is defined by the queue units 307, 308, 309 and 310 sizes and by the FFT size in FFT unit 302.

The output of the average units 311, 312, 313 and 314 will be compared by individual threshold values in comparators units 315, 316, 317 and 318 respectively. Each average input will be compared with a threshold value determined specifically for each spectrum analysis parameter.

As described earlier, the skewness value must be low. Then a fixed threshold value (thd1) must be determined in order to represent how low the skewness should be in order to create an indication of howling noise presence. The comparator unit 315 compares the output of the average unit 311 against the fixed threshold value (thd1), and if it is lower than the fixed threshold value (thd1), it will output a true result.

As described earlier, the flatness value must be high. Then a fixed threshold value (thd2) must be determined in order to represent how high the flatness should be in order to create an indication of howling noise presence. The comparator unit 316 compares the output of the average unit 312 against the fixed threshold value thd2, and if it is higher than the fixed threshold value thd2, it will output a true result. As described earlier, the crest value must be low. Then a fixed threshold value (thd3) must be determined in order to represent how low the crest should be in order to create an indication of howling noise presence.

The comparator unit 317 compares the output of the average unit 313 against the fixed threshold value (thd3), and if it is lower than the fixed threshold value (thd3), it will output a true result.

As described earlier, the rolloff value must be high. Then a fixed threshold value (thd4) must be determined in order to represent how high the rolloff should be in order to create an indication of howling noise presence. The comparator unit 318 compares the output of the average unit 314 against the fixed threshold value (thd4), and if it is higher than the fixed threshold value (thd4), it will output a true result.

The AND port unit 319 will receive the output from each comparator units 315, 316, 317 and 318, if all the comparators outputs true, indicating that all the threshold rules were attended, then it outputs true indicating that a howling noise is really present in the audio signal. If any one of the comparators units 315, 316, 317 and 318 outputs a false result, it means that no howling noise is present anymore, and then it will output false, indicating that no howling noise is present in the audio signal.

Finally, after having a result about the howling presence, the howling noise detector outputs the result to other layers in the MCU unit 101. The MCU unit 101 decides then to block or unblock the audio from being mixed to the other conference participants. If the MCU unit 101 is in a state where the howling noise was already detected and the howling detector unit 100 outputs false, it may unblock the audio. If the MCU unit 101 is in a state where the howling noise was not detected and the howling detector unit 100 outputs true, it may block the audio.

As an example, a test with an audio stream containing some kinds of audio was created according the Table 1.

TABLE 1

Audio stream test specifications

| Ref Nr. | Audio signal type |
|---|---|
| 900 | A signal composed of 6 frequencies peaks (6 tones) |
| 901 | A howling signal created with the microphone positioned against the speaker |
| 902 | The beginning of a low power howling signal |
| 903 | A DTMF tone signal |
| 904 | A recorded speech where the talker is pronouncing the "I" vowel for a period of time |
| 905 | A recorded speech where the talker is screaming the "A" vowel for a period of time |
| 906 | A recorded speech where the talker is just talking for a long period of time |
| 907 | A recorded speech where the talker is talking with intensity |
| 908 | A howling signal created with audio being filtered with a low pass filter |

This audio stream was then used as input for the howling detector unit 100 and the output values of each average unit 311, 312, 313, 314 were saved. Then, the saved outputs were used to plot graphics according FIGS. 5, 6, 7 and 8.

Each point in the curve of the FIGS. 5, 6, 7 and 8 represents the output or each average unit 311, 312, 313, 314. The time cadence that they were generated was based on the FFT unit 302 size, which in the case here was defined to 128 milliseconds (1024 samples of audio at 8 KHz).

By analyzing the plotted graphics shown in FIGS. 5, 6, 7 and 8 table 2 was created in order to explain the relationship of the parameters.

TABLE 2

Audio stream test comparison

| Audio signal type ref nr. | RollOff (thd: 0, 55) | Crest (thd: 0, 15) | Flatness (thd: 0, 2) | Skewness (thd: 16) |
|---|---|---|---|---|
| 900 | HIGH | LOW | LOW | LOW |
| 901 | HIGH | LOW | HIGH | LOW |
| 902 | HIGH | LOW | HIGH | LOW |
| 903 | LOW | HIGH | LOW | LOW |
| 904 | LOW | HIGH | HIGH | HIGH |
| 905 | LOW | LOW | HIGH | LOW |
| 906 | HIGH | LOW | HIGH | HIGH |
| 907 | LOW | LOW | HIGH | HIGH |
| 908 | HIGH | LOW | HIGH | LOW |

The table 2 shows pretty clear a special result when the howling noise is present. The audio stream parts indicated by the reference numbers 901, 902 and 908 are all a part of the audio stream where the howling noise is present, in the table 2, it can be seen that the stream parts where the howling noise is present share the same specific logic and no other stream than the howling noise results in the same logic.

Considering the specific logic that happens just when the howling noise is present, it can be used in order to detect the presence of the howling noise and then it makes possible to take a decision based on it.

| Reference Numerals | |
|---|---|
| 100 | Howling Detector unit |
| 101 | Multipoint Control Unit (MCU) |
| 103 | Audio mixer |
| 111 | Client1 |
| 112 | Client2 |
| 113 | Client3 |
| 123 | Acoustic Loop 1 |
| 124 | Acoustic Loop 2 |
| 126 | Echo-canceller Unit |
| 127 | Echo-canceller Unit |
| 128 | Echo-canceller Unit |
| 301 | DC filter unit |
| 302 | FFT |
| 303 | skweness analysis unit |
| 304 | Flatness analysis unit |
| 305 | Crest analysis unit |
| 306 | Rolloff analysis unit |
| 307 | Circular queue |
| 308 | Circular queue |
| 309 | Circular queue |
| 310 | Circular queue |
| 311 | Average unit |
| 312 | Average unit |
| 313 | Average unit |
| 314 | Average unit |
| 315 | Comparator unit |
| 316 | Comparator unit |
| 317 | Comparator unit |
| 318 | Comparator unit |
| 319 | AND port unit |
| 900 | A signal composed of 6 frequencies peaks (6 tones) |
| 901 | A howling signal created with the microphone positioned against the speaker |
| 902 | The beginning of a low power howling signal |
| 903 | A DTMF tone signal |
| 904 | A recorded speech where the talker is pronouncing the "I" vowel for a period of time |
| 905 | A recorded speech where the talker is screaming the "A" vowel for a period of time |
| 906 | A recorded speech where the talker is just talking for a long period of time |
| 907 | A recorded speech where the talker is talking with intensity |
| 908 | A howling signal created with audio being filtered with a low pass filter |
| thd1 | Fixed threshold value 1 |
| thd2 | Fixed threshold value 2 |
| thd3 | Fixed threshold value 3 |
| thd4 | Fixed threshold value 4 |

The invention claimed is:

1. A method for avoiding a howling disturbance on conferences, comprising:
using a howling detector unit implemented inside a multipoint control unit to receive an audio stream input from a client, the audio stream input having a frequency spectrum;
analyzing the audio stream input with the howling detector in order to verify whether howling noise is present by using at least two of:
a skewness analysis to determine whether the howling noise is present via a first analysis on the frequency spectrum of the audio stream input,
a flatness analysis to determine whether the howling noise is present via a second analysis on the frequency spectrum of the audio stream input,
a crest analysis to determine whether the howling noise is present via a third analysis on the frequency spectrum of the audio stream input, and
a rolloff analysis to determine whether the howling noise is present via a fourth analysis on the frequency spectrum of the audio stream input,
in response to detecting the howling noise, preventing the audio stream input to be forwarded as an output to an audio mixer.

2. The method of claim 1, wherein in the analyzing of the audio stream input includes the skewness analysis and one or more of the flatness analysis, the rolloff analysis, and the crest analysis, the skewness analysis being carried out by measuring an asymmetry of a distribution around a mean value.

3. The method of claim 1, wherein the analyzing of the audio stream input includes the flatness analysis and one or more of the flatness analysis, the rolloff analysis, and the crest analysis, the flatness analysis being carried out by calculating a ratio of a geometric mean to an arithmetic mean and quantifying sound of the audio stream input as a noise-like sound or as a tone-like sound.

4. The method of claim 1, wherein the analyzing of the audio stream input includes the crest analysis and one or more of the flatness analysis, the rolloff analysis, and the crest analysis, the crest analysis being carried out by calculating a ratio of peak values within spectral frequencies to an arithmetic mean of an energy spectrum of the audio stream input.

5. The method of claim 1, wherein the analyzing of the audio stream input includes the rolloff analysis and one or more of the flatness analysis, the rolloff analysis, and the crest analysis, the rolloff analysis being carried out by calculating a frequency so that a pre-defined percentage of a signal energy is contained below a frequency of the audio stream input.

6. The method of claim 1, comprising:
the multipoint control unit automatically starting a process to inform the one or more clients that are generating the howling noise disturbance and/or the other clients that are not generating the howling noise disturbance about the howling noise disturbance.

7. The method of claim 6, comprising:
the client that generated the howling noise disturbance solving the problem locally so that no howling noise is present and the multipoint control unit automatically remixing the client to the audio stream input again in response to the solving of the problem locally and informing this client and/or the other clients about the remixing.

8. The method of claim 1, wherein the analyzing of the audio stream input with the howling detector in order to verify whether howling noise is present comprises all of:
(i) the skewness analysis such that the skewness analysis is performed to measure an asymmetry of a distribution around a mean value;
(ii) the flatness analysis such that the flatness analysis is performed for calculating a ratio of a geometric mean to an arithmetic mean and quantifying sound of the audio stream input as a noise-like sound or as a tone-like sound;
(iii) the crest analysis such that the crest analysis is performed for calculating a ratio of peak values within spectral frequencies to an arithmetic mean of an energy spectrum of the audio stream input; and
(iv) the rolloff analysis such that the rolloff analysis is performed for calculating a frequency so that a pre-defined percentage of a signal energy is contained below a frequency of the audio stream input.

9. The method of claim 1, wherein the analyzing of the audio stream input with the howling detector in order to verify whether howling noise is present comprises at least three of:
(i) the skewness analysis such that the skewness analysis is performed to measure an asymmetry of a distribution around a mean value;
(ii) the flatness analysis such that the flatness analysis is performed for calculating a ratio of a geometric mean to an arithmetic mean and quantifying sound of the audio stream input as a noise-like sound or as a tone-like sound;
(iii) the crest analysis such that the crest analysis is performed for calculating a ratio of peak values within spectral frequencies to an arithmetic mean of an energy spectrum of the audio stream input; and
(iv) the rolloff analysis such that the rolloff analysis is performed for calculating a frequency so that a pre-defined percentage of a signal energy is contained below a frequency of the audio stream input.

10. A system for avoiding howling disturbance on conferences comprising:
a multipoint control unit communicatively connectable to a plurality of clients, the clients including a first client and a second client;
a howling noise detector configured to detect a howling noise, the howling detector being implemented inside the multipoint control unit to receive an audio stream input from each of the clients;
the howling noise detector comprising at least two of:
a skewness analysis unit to measure an asymmetry of a distribution around a mean value,
a flatness analysis unit to calculate a ratio of a geometric mean to an arithmetic mean and quantify sound of the audio stream input as a noise-like sound or as a tone-like sound,
a crest analysis unit to calculate a ratio of peak values within spectral frequencies of the audio stream input to an arithmetic mean of an energy spectrum of the audio stream input, and
a rolloff analysis unit to calculate a frequency so that a pre-defined percentage of a signal energy is contained below a frequency of the audio stream input;
a prevention unit configured to disable and/or enable a procedure to prevent the audio stream input to be forwarded to an audio mixer in response to detection of the howling noise in the audio stream input.

11. The system of claim 10, wherein the howling detector unit comprises at least three of:
the skewness analysis unit;
the flatness analysis unit;
the crest analysis unit; and
the rolloff analysis unit.

12. The system of claim 10, wherein the howling detector unit comprises a DC filter unit and/or a fast Fourier transformation (FFT) unit.

13. The system of claim 10, wherein the howling detector unit comprises at least one fixed sized circular queue to separately queue an output of at least one of: a skewness analysis unit, a flatness analysis unit, a crest analysis unit and/or a roll-off analysis unit.

14. The system of claim 13, wherein the howling detector unit comprises at least one average unit to individually average the output of the queue.

15. The system according to claim 14, wherein the howling detector unit comprises at least one comparator unit to compare by an output of the average unit to an individual threshold value.

16. The system of claim 15, wherein the howling detector unit comprises an AND port unit to analyze at least two individual threshold value outputs generated by at least two comparator units and forward a single Boolean value informing the multipoint control unit to prevent the audio stream input from being mixed in the audio mixer or release the audio stream input to be mixed via the audio mixer.

17. The system of claim 10, wherein the system is included in a private branch exchange (PBX), a telecommunication device, a personal computer (PC), a closed loop control system equipped with Automatic Gain Control (AGC), or a telecommunication device having a web application.

18. The system of claim 10, wherein the howling detector unit includes the skewness analysis unit and the flatness analysis unit.

19. The system of claim 10, wherein the howling detector unit includes the crest analysis unit and the rolloff analysis unit.

20. The system of claim 10, wherein the howling detector unit includes the skewness analysis unit and at least one of the crest analysis unit and the rolloff analysis unit.

* * * * *